United States Patent
Lewis

(10) Patent No.: US 6,265,029 B1
(45) Date of Patent: Jul. 24, 2001

(54) LOW-COST, USER-FRIENDLY HARDCOATING SOLUTION, PROCESS AND COATING

(76) Inventor: William Lewis, 457 Rivercreek Ct., Chula Vista, CA (US) 91914-2017

( * ) Notice: Subject to any disclaimer, the term of this patent is extended or adjusted under 35 U.S.C. 154(b) by 0 days.

(21) Appl. No.: 09/328,725

(22) Filed: Jun. 7, 1999

Related U.S. Application Data

(60) Continuation-in-part of application No. 08/771,866, filed on Dec. 23, 1996, now abandoned, which is a division of application No. 08/430,251, filed on May 4, 1995, now Pat. No. 5,665,814.

(51) Int. Cl.$^7$ ........................................................ B05D 1/38
(52) U.S. Cl. ........................ 427/378; 427/387; 427/412.1
(58) Field of Search .................................... 427/387, 378, 427/412.1

(56) References Cited

U.S. PATENT DOCUMENTS 3,986,997 * 10/1976 Clark .
4,313,979 * 2/1982 Frye et al. ............................ 427/387

* cited by examiner

Primary Examiner—Erma Cameron

(57) ABSTRACT

An improved, user-friendly silane/silica sol copolymer hardcoating composition for protecting optical plastic and other substrates (including wood, metals, glass, plastics and most coated articles) from scratching is able to be manufactured at lower costs and to provide much-improved ease of use in transportation, storage, dipbath (or other coating tank) stability, and blush resistance in ordinary cleanroom atmospheres. The silane/silica sol copolymer is formed as a direct reaction product of an acidic silica sol and monomethyltrialkoxysilane, preferably substantially monomethyltriethoxysilane, in ratios of 30:70 to 70:30, most preferably about 40:60. A tail solvent aids blush resistance, reduces internal stress and permits adhesion to unprimed polycarbonate. Optionally, colloidal silica sol dissolved in water-miscible solvent may be reacted in a second stage with acidic aqueous colloidal silica sol earlier silanized with monomethyltrialkoxysilane.

7 Claims, No Drawings

LOW-COST, USER-FRIENDLY HARDCOATING SOLUTION, PROCESS AND COATING

This is a continuation-in-part application of Ser. No. 08/771,866, filed Dec. 23, 1996, now abandoned, which is a divisional of Ser. No. 08/430,251, filed May 4, 1995, now U.S. Pat. No. 5,665,814.

FIELD OF THE INVENTION

The chemical family of silane/silica sol copolymer compositions finds commercial use in heat-curing scratch-resistant hardcoats applied mainly to clear plastic sheets and molded parts. The present invention makes improvements in lowering costs and improving ease of use and performance of specific chemical compositions of monomethyltrialkoxysilane copolymerized with acidic aqueous silica sol. These compositions are to be coated onto molded or cast optical lenses (including auto headlamp lenses and spectacle lenses and sports eyewear), plastic extruded or cast sheet (used for windows, protective covers, etc.), and other substrates needing a scratch-and scuff-protective surface finish.

BACKGROUND OF THE INVENTION

Clark (U.S. Pat. No. 3,986,997, issued Oct. 19, 1976; and U.S. Pat. No. 4,027,073, issued May 31, 1977) is the basis for the first commercially useful silane/silica sol copolymer hardcoats for optical plastics. Clark is still serving as the basis for the commercially successful line of nontintable clear hardcoats for optical plastics offered by SDC Coatings of Anaheim, Calif. SDC is a joint-venture company of Swedlow (now re-named Pilkington Aerospace) and Dow Corning; the latter is the assignee of the Clark patents. SDC's commercial dipcoating formulation Silvue 101 is believed to be a higher % solids version of a Clark formulation (suited for dip coating); all Clark coatings are acidic pH.

Next came the GE Silicone entries into this field, as embodied in Frye (U.S. Pat. No. 4,299,746, issued Nov. 10, 1981; U.S. Pat. No. 4,324,839, issued Apr. 13, 1982; U.S. Pat. No. 4,413,088, issued Nov. 1, 1983) and Vaughn (U.S. Pat. No. 4,309,319, issued Jan. 5, 1982; U.S. Pat. No. 4,324,712, issued Apr. 13, 1982; U.S. Pat. No. 4,414,349, issued Nov. 8, 1983). All the abovementioned GE Silicone patents employ an alkaline pH aqueous colloidal silica dispersion, and their resulting coatings are alkaline pH, in contrast to Clark's. GE's commercial dipcoating formulation SHC-1200 is a commercially useful reference point.

Both the Clark/SDC and the Frye/Vaughn/GE coatings form heat-cured clear coating films of excellent scratch resistance (commonly tested with steel wool pads under load with a rubbing action, to simulate cleaning-type damage) and thereby offer essentially equivalent protection to the clear plastic substrates, when applied and cured at equal thicknesses. Both are sold at very high prices (on 100% solids basis, typically $80–110 per pound or more). Because of a greater propensity for autopolymerization inherent in the alkaline aqueous dipcoating solutions of the Frye/Vaughn/GE formulas, wherein polysiloxane bond formation via condensation reaction is favored over maximizing silanol stability (particularly as storage temperature or bath temperature is increased towards room temperature), use of acidic aqueous silica/silica sol copolymer, as in the Clark/SDC compositions, is preferred and therefore is the chemical basis for the present invention.

For users purchasing these liquid coatings, in addition to paying high prices for the coating material, there is the special handling required of refrigerated shipping and storage. Most particularly when dipcoating tanks are of large capacity, it is necessary to keep the contents chilled to minimize the rate of auto polymerization. "For maximum solution stability, Silvue abrasion-resistant coatings should be refrigerated at −18 to +4° C. degrees (0 to 40° F. degrees)", from SDC 5 Product Information Sheet #130-0, March 1993).

Another indirect cost to the user is the need to apply these water-based silane/silica sol copolymers—including dip, flow or spray coating operations and coating solvent-drydown areas—at very low humidity, typically a maximum of 35–40% R.H. Reference is made to GE Silicones product literature titled "SHC 1200 Optical Grade Abrasion-Resistant Silicone Hard Coat & SHP Primer" #CDS 4532 (May 1990), stating . . . "relative humidity controlled to 35% or less", and the previously-referenced Silvue literature , stating . . . "relative humidity of less than 40% is recommended. Variations from these conditions may result in blushing of the coating or a poor film formation". Thus, for optically and cosmetically satisfactory hardcoatings of spectacle lenses and other optically useful products, not only are the usual clean room conditions with HEPA-filtered, laminar airflow desirable, but the mandated maximum relative humidities are below the range which can be readily attained by ordinary HVAC interior air conditioning systems during year-round use. Supplemental dehumidification is needed, calling for expensive regenerative-desiccant-bed air-handling equipment which can easily exceed $100,000 capital, just to handle the volume of clean air recirculating within a fully-enclosed room or machine used for applying such coatings.

"Blush" can be defined as a hazy or foggy appearance within the otherwise-transparent cured film of the coating, which appears during drydown of the coating. Early versions of low-solids, high-water-content Clark coatings when applied, dried, and cured in ordinary, ambient conditions had very poor "blush" resistance; 30 grains of moisture or less was then specified as necessary in the air of the coating drydown area. Subsequently, the added step of azeotropic stripping of those 20% nominal solids was found to remove both excess alcohol and part of the excess water, so that the resulting stripped 35% solids Clark solutions had greater "blush" resistance & humidity tolerance. However, this stripping operation adds substantially to manufacturing costs.

Since the time of the Clark and Frye/Vaughn inventions, solvent-based colloidal silica sols have become commercially available. Potentially, they represent an alternative way of reducing the sensitivity of these silane/silica sol copolymer hardcoats to ambient levels of humidity, for increased "blush" resistance. Excess water in the liquid coating composition is defined as that which exceeds 100% stoichiometric amounts needed for hydrolysis of the alkoxy groups on the silane (3 moles of water per 1 mole of trialkoxysilane), in order to form the siloxane bond between the silane and the silica sol. Use of a solvent-based silica sol may actually require adding water to meet stoichiometric requirements for proper formation of the copolymer. However, the economic impact of replacing the aqueous silica sols with solvent-based silica sols is extremely negative, by at least a five-fold to ten-fold price factor. For example, Clark's preferred aqueous silica, Nalco 1034A (from Nalco Chemical; Naperville, Ill.), costs about $3 per pound on 100% solids basis, in drum quantities. By comparison, an alcohol-based sol of equivalent particle size from Nissan Chemical (New York City) costs over $75 per pound on equivalent 100% solids basis. A more recent one commercialized by Nalco still costs about $17 per pound on 100% solids basis, so for lowest costs, solvent-based silicas need to be minimized or eliminated in the coating formulation.

Notwithstanding this cost factor, solvent-based silicas have been copolymerized with various organofunctional (most commonly, epoxide attached by propyl to silicon) trialkoxysilanes, to make tintable dipcoatings for protecting plastic ophthalmic prescription spectacle lenses. Such coated lenses can be readily dip-dyed for desirable colorations. In these formulations, the organofunctional group attached to the silane is chosen for dye receptivity. Such coatings can be crosslinked by heat (examples in which Applicant was co-inventor are U.S. Pat. Nos. 5,013,608 and 5,102,695) or by ultraviolet as radiation (examples in which Applicant was co-inventor are U.S. Pat. Nos. 5,221,560 and 5,296,295). These specialized tintable Rx lens coatings are used on lower volume, high priced lenses, so they can tolerate higher-priced silicas and silanes than the general-purpose Clark hardcoatings.

Athough the Clark/SDC and the Frye/Vaughn/GE coatings provide "excellent" scratch resistance compared to prior art coatings, further improvements are desired and needed, not only for clear plastic substrates but also to protect the surfaces of non-transparent plastics, metals, woods, and even painted or finished articles. The deficiencies of the SDC/GE coatings are readily seen when they are rubbed with coarser steel wools than the finest, #0000, typically used in demonstrating their scratch resistance.

A convenient and effective embodiment of such a test is the Progressive Steel Wools (PSW) test. Successive grades of steel wools are rubbed 10 strokes (5 double rubs, back and forth) under very firm (at least 10 pounds) thumb pressure on the article to be tested, cross-wise of the alignment of the wool fibers. Depending on the hardness of the coating, and of the substrate it is on, there may be no visible scratches using the finest steel wool(s). However, coarser wools will produce marks—fine, medium, or coarse scratches. A coating is considered to have survived testing with a given grade of steel wool if there are a half-dozen or fewer scratches visible to the naked eye after such rubbing.

Another method of testing the hardness of coatings, unfortunately only applicable to flat substrates, is the Taber abrasion test. Using CS-10 wheels, Clark/SDC and Frye/Vaughn/GE coatings typically increase in haze about 5–7% after 500 revolutions of the grit-filled, abrasive wheels, which scuff the surface tested in a rolling/skidding motion. Harder coatings that are user-friendly are sought after.

A third method of testing the hardness of coatings, which is particularly used in the ophthalmic (prescription eyeglass lens) industry, is the AO tumble test. In this test, coated or uncoated articles, usually lenses, are tumbled with abrasive pads, grit, sawdust, etc. to simulate in-use wear. The test (details available from American Optical Lens Corp, Southbridge Mass.) was correlated at the time of its development with 1- and 2-year eyeglass lens wear tests using several materials and coatings. After tumbling and cleaning, the samples are compared against standards, and ranked, with a score of 10 being the highest.

OBJECTIVES OF THE PRESENT INVENTION

It is one objective of the present invention to make an acidic silane/silica sol copolymer hardcoating with the lowest possible manufacturing costs, by employing mostly or all low-cost aqueous silica sols with minimal or no solvent-based sols, and further, by using the copolymer "reaction products" without any subsequent step of azeotropic stripping of excess solvent and water.

It is another objective of the present invention to make said acidic silane/silica sol copolymer compositions which heat-cure to transparent films of equal or preferably better hardness (e.g., Taber abrasion resistance) and steel-wool scratch resistance as the competitive SDC and GE coatings.

It is another objective of the present invention to make said silane/silica sol copolymer compositions with improved resistance to autopolymerization/gelation and thereby eliminate any need for refrigerated transportation, and to provide improved stability in dipbath (or other coating method) operating conditions and/or in inventory storage.

It is another objective of the present invention to eliminate any need to use desiccant air-drying equipment in the area where the liquid coating is applied and devolatilized, and be able to successfully dry down these coating films without "blush" using relative-humidity-control conditions (typically 40–55% R.H.) achievable with normal HVAC air-conditioning, or even up to about 75% R.H without air conditioning.

It is another objective of the present invention to make a silane/silica sol copolymer in a "self-priming" formulation which successfully adheres to polycarbonate and other difficult-to-adhere-to substrates without priming or any special pre-treatment other than standard washing to remove surface impurities.

It is another objective of the present invention to provide coatings which can be cured thicker without cracking or crazing, compared to prior art coatings, to provide improved resistance to severe abuse, represented by scratching with relatively coarse steel wools.

It is another objective of the present invention to provide abrasion resistant hardcoatings which can be practically and economically applied, with minimal operator training, to a wider variety of substrates than prior art coatings—such as wood, furniture or paneling, polished or chemically- or electrochemically-treated metals, painted (or varnished, powder coated, etc.) articles, plastic films, glass, etc.

It is another objective of the present invention to provide relatively low-cost, user-friendly hardcoatings which can be used as part of a multicoat system to lower overall costs of coated articles and/or improve environmental impact, in which a less-expensive and/or more environmentally friendly base coat system replaces a more-expensive and/or less environmentally friendly complete-coat system, and is topcoated with a coating of the present invention, to provide overall properties and performance which exceeds the prior art coating system in benefits compared to costs and environmental impact.

SUMMARY OF INVENTION

The present invention comprises an improved acidic silane/silica sol copolymer hardcoating composition and process for protecting optical plastic and other substrates, a method for improving abrasion resistance of many types of articles, including plastics and consumer and industrial goods, and the resulting improved articles. In a preferred embodiment, the acidic silane/silica sol copolymer is formed as a direct reaction product of an acidic aqueous silica sol and an monomethyltrialkoxysilane other than methyltrimethoxysilane, in dry weight ratios of 30:70 to 70:30, most preferably about 40:60.

Preferably, no distillation off nor vacuum stripping of excess solvent and/or excess water is required, just control of temperature and time. The formulation also contains a "tail solvent", which is not water. Herein, a "tail solvent" is defined as "the last to leave" during devolatilization of the wet coating film. That is, the tail solvent has lower volatility than water and the lowest evaporation rate and/or highest boiling point of all the solvents present. It can be expected to have a B.P. >100° C.

Surprisingly, it has been found that the to monomethyltrialkoxysilane of choice in the cited Clark & Frye/Vaughn patents, methyltrimethoxysilane ("Z6070", in Dow Corning product nomenclature) contributes greatly to the problems previously listed. Both of the SDC and GE commercial hardcoatings mentioned previously also can be logically deduced to substantially employ this silane as the monomethyltrialkoxysilane constituent (as seen by their % solvent breakdown in their respective MSDS data sheets, which show very high % methanol). The only exception to this is an example found in Frye U.S. Pat. No. 4,324,839 wherein tiny amounts of monomethyltriacetoxysilane are used with predominantly methyltrimethoxysilane to buffer the alkaline sol pH in Examples 1–3 (thus using the tiny amounts of monomethyltriacetoxysilane as a latent source of acetic acid).

Applicant has found that higher-alcohol substituents for the alkoxy group are preferred over methoxy, for reasons mentioned herein, and specifically, ethoxy is preferred over methoxy. All silane/silica sol copolymer prior art is silent on any such advantages, nor even consideration of ethoxy-based silanes in any examples. Therefore, the central element of the present invention is that Applicant employs mostly monomethyltriethoxysilane (using ethanol as the alkoxy group) in Applicants choice for monomethyltrialkoxy silane, with minor (50%) or, preferably, no methyltrimethoxysilane in the formulation.

DETAILED DESCRIPTION OF INVENTION

The silica sol constituents are preferably dispersions of colloidal silica of average particle size <100 millimicrons in diameter, preferrably acidified and predominantly aqueous (although some blends with solvent-based sols have special benefits which may offset their higher costs), and more preferably, an average particle size of 10–30 millimicrons. In one preferred embodiment, the chosen acidified silica sol is Nalco 1042 (from Nalco Chemical; Naperville, Ill.), having nominal 34% SiO2 solids and about 15-millimicron average particle size. Nyacol 2034DI, made by the PQ Corporation, Valley Forge, Pa., was a functional equivalent to Nalco 1042. See Example 1 & others. In another preferred embodiment, a solvent-based sol (Nalco 1057, 30% solids in glycol ether (2-propoxyethanol)) is chosen along with the acidified aqueous silica sol Nalco 1042, so the resultant coating is a copolymer of both. See Example 2 & others. A similar solvent-based silica is now available as Highlink OG-402 from Clarion Corporation. Alternatively, the silica sol may be partly or entirely prepared in situ, by reaction of a tetraalkoxysilane ester with water (equal, less, or greater than the theoretical stoichiometric ratio). Other metal sols and/or their precursors may also be used as functionally equivalent minor components of the mixture, for specific purposes such as increasing refractive index or modifying the hardness or flexibility of the coating.

In the preferred 30:70 to 70:30 dry weight ratios (calculated as $SiO_2:CH_3SiO_{3/2}$) of the present invention for silica sol:monomethyltrialkoxysilane, there may be a stoichiometric excess of water already present. Mixing monomethyltriethoxysilane and silica sol constituents in the presence of acetic acid (or formic acid, or similar weak organic acid) at the desired pH range causes hydrolysis of the alkoxy groups on the silane and start of condensation-reaction copolymerization between the silica sol and silane constituents, which is optionally promoted by warming the reaction mixture to a moderately elevated temperature. Copolymerization rate (sometimes called "silanization") is a function of the specific acid, concentrations of reactants, time, temperature and pH. Generally, a pH from 4.5 to 5.5 appears to be optimum for storage stability of the liquid coating. Less acid during hydrolysis can speed up the aging or "bodying" of the coating (with more acid added later) but can increase undesirable branching of the siloxane oligomers formed. Only small amounts of strong organic mineral acids can be tolerated by the coatings without rapid bulk gellation (extremely low pH is to be avoided when maximizing shelf/bath life). The weak organic acids are strongly preferred, in the previously mentioned preferred pH range. These weak organic acids, such as acetic acid, are typically buffered by the added catalyst and can be further buffered by volatile amines, whether or not they act as cure catalysts.

Coatings of the present invention are thermosettable—crosslinking after evaporation of the solvent and water by well-known siloxane condensation reactions—so in theory any of those siloxane condensation catalysts commonly known to those skilled in the art could be used in the cure reaction. However, some work better at the lower temperatures which are tolerated by plastic substrates (typically 70–130 C.), and others lack miscibility, or upset the pH range needed for coating solution stability. So, like the Clark acidic aqueous silica sol:monomethyltrimethoxysilane copolymers, cure reactions can employ buffered latent catalysts such as alkali metal salts of carboxylic acids, amines or quaternary amines (amine carboxylates), and ammonium carboxylates. For example, sodium acetate acts as an in situ latent buffered catalyst, such that, after all solvent and water is removed and heating occurs, the catalyst breaks down to give the high-pH conditions known to promote siloxane condensation. Applicants also have prior experience with metal complexes such as aluminum acetylacetonate, but find the quaternary amines (amine carboxylates) are preferred as most active. Typical concentrations are 1.0% or less, measured "solids on solids" ("s/s"), based on the total dry weight in the formulation. It is possible to cure the coatings at ambient or elevated temperature, using any convective or radiant heat source. However, there is usually a preferred temperature range in which cracking or crazing is minimized, and adhesion maximized, as in the range noted above for plastics—which works well for many substrates.

In addition to the methyltriethoxysilane or other methyltrialkoxysilane used as a major component of the coatings of the present invention, smaller amounts of other organofunctional silanes such as methacryloxypropyltrimethoxysilane, glycidoxypropyltrimethoxy- (or -ethoxy-)silane, chloropropyltrimethoxysilane, glycidoxypropylmethyidiethoxysilane, etc., may be added. Typically, such silanes would be added to increase adhesion to a substrate or to a subsequently applied overcoating (especially via vacuum deposition) or to increase flexibility of the coating. To maximize cured coating film hardness and scratch resistance, the resulting silane mix should still be mostly monomethyl silane. Tint-uptake enhancing additives (see previously-cited U.S. Pat. Nos. 5,013,608 and 5,102,695), tints/pigments, UV absorbing, anti-static, or antifog-promoting additives and/or flattening agents (for matte coatings) are also contemplated.

When the desired degree of copolymerization (sometimes called "bodying") has been reached, cooling and/or dilution of the reaction mixture with cold solvent helps stop the copolymerization. Among common solvents, diacetone alcohol or (blends of) lower-aliphatic alcohols are preferred. Up to about half of the aqueous silica may be replaced with an alcohol-based silica (or equivalent substitute), if desired, to further improve the coating stability. When a solvent-based silica is used in conjunction with an aqueous silica, it is important that the aqueous silica be at least partially silanized before adding the solvent-based silica (and additional silane), or else compatibility problems and/or precipitates can result. Likewise, silanization should be far along toward completion before the latent catalyst ingredient is added, whichever type of silica is used, or else precipitates and gel particle formation will be excessive. It is preferred to react the solvent-based silica with silane in the presence of the (silanized) aqueous silica, so that the latter is the source of water for hydrolysis of the silane reacted with the solvent-based silica.

In a specially preferred embodiment, diacetone alcohol is selected as the "tail solvent". It is typically present at a level of 3–20% of the total coating formulation in its "ready-to-use" state. Diacetone alcohol was found to be preferred over ordinary aliphatic alcohols such as butanol, 1-methoxy-2-propanol, or Cellosolve (alkoxy ethanol) alcohols or their esters, or commonly available ketones, for its desirable balance of hydrogen bonding, polarity, and miscibility with the siloxane copolymer backbone. It also seems to contribute to primerless adhesion on difficult-to-adhere-to substrates such as polycarbonate and to minimizing blush problems during drydown.

The coating compositions of the present invention can be applied by any conventional process, including dip, flow, spin, and spray. For high-volume automated coating of both sides of optical plastic or other substrates at minimum costs, dipping is usually preferred. Flow coating is advantageous for smaller volume operations, since equipment costs and quantity of liquid coating in recirculated use can be minimized. Spin coating usually gives the most uniform coating thickness, when substrate shape permits its use.

A unique and surprising feature of the coating solutions of the present invention is that they can be prepared at ambient temperature in a simple process using extremely simple hardware. In the place of expensive custom-engineered reactors, wiped-film evaporators and/or distillation systems for stripping under reflux which are used with some prior art technologies known to Applicant, a balance, and a manual or mechanical means of chemical transfer (e.g., transfer pump, tubing, and optional filter) and of solution agitation are all that are required in simplest embodiments of the present invention. A drum heater to accelerate the initial aging or "bodying" of the coating solution is optional. Thus, the capital costs for equipment can be reduced to 1/10th or less. Chillers, as would be required for making—or using—methyltrimethoxysilane-based coatings, are also unnecessary.

"Bodying" of the coating solution, i.e., heating to elevated temperature or aging at room temperature to increase viscosity, presumably by fostering oligomerization and increasing molecular weight of the resulting silane/sol copolymer thermosettable resin, is commonly carried out to improve flow-out of the coating. The use of leveling or wetting agents also improves flow-out and smoothness of the coating. Such surfactants are preferably Fluorad PC-430 (a non-ionic fluorinated alkyl ester made by 3M Co., St. Paul, Minn.), used at a typical concentration of 0.01–0.1 PHR (parts hundred resin), or alternatively a silicone-glycol copolymer such as DC 190 (made by Dow Corning Corp., Midland, Mich.) or BYK-300 (made by Byk-Chemie USA; Wallingford, Conn.) or other surfactant. Use of such surfactants is preferred because of the good surface smoothness obtained, even on imperfectly cleaned substrates, and because reducing the need for a bodying step can improve the subsequent shelf life of the coating. The storage and tank or bath stability of the coating compositions of the present invention depends, as expected from the prior art cited and ordinary chemical knowledge, on a variety of factors including pH, co-solvents or tail solvents used, loss of solvent and/or water due to evaporation, and ambient temperature. Nevertheless, under normal use and storage, the coating compositions of the present invention will be essentially stable (i.e., useful) for at least several weeks at room temperature, and may be useably stable for months. Stability—or the lack thereof—is determined by large-multiple increases in viscosity and/or haze or rapid plugging of filters due to the increasing rate of micro-gelation (producing gel particles in the coating) or onset of bulk gelation; or the loss of initially-obtained basic properties in the cured coating: adhesiveness to the coated substrate, scratch resistance, or clarity. On polycarbonate, for example, the coatings may require longer cure at a given temperature (typically 121–130 C.) to achieve 100% adhesion as the coating ages. This increasingly reluctant adhesion with increased aging of the liquid coating continues until even an overnight cure (nominal 16 hours at 250 F.) is insufficient (unless freshly-prepared coating is blended in). Such a loss of adhesiveness despite overnight cure is an example of a loss of a basic property. In contrast, with fresh coating, 100% adhesion on polycarbonate is achieved typically in 2–6 hours at 121–130 C. (and on acrylics in 2–4 hours at 160–180 F.), as measured by the well-known cross-hatched tape adhesion test (ref: ASIM-D-3359, modified by substitution of 3M #600 tape instead of #710 for use in this test, due to its greater adhesiveness, thus providing a relatively more "severe" test). Excellent adhesion is defined as at least 90% retention of coating in the crosshatched area after 3 rapid pulls with firmly-rubbed-down adhesive tape.

A useful reference for abrasion resistance loss in cured coatings made from aged liquid coating is the PSW test result before vs. after the aging. Using the same operator, coarseness of wool, and technique, an average tripling of visible scratches in the range of 0.5 to 5 dozen can be taken as a loss of this basic property. In evaluating haze in clear coatings made from aged hardcoating solution, an increase to more than 3% haze in the cured coating, as measured using a commercial haze meter, is considered to signify a lost basic property. However, this does not apply with non-clear coatings, or when the haze can be shown to be due to another cause, such as a specific interaction with the substrate (e.g., attack on an undercured primer or base coat).

A surprising result obtained with the coatings of the present invention is the lack of crazing, cracking and/or adhesion loss when extra-thick coatings are applied and cured. While not wishing to be bound to a particular theory, we believe that, consistent with their lower tendency to gel in solution, the molecular structure of these compositions of the present invention cure, cross-link, and/or set up more slowly, after the wet coating has been applied onto a substrate, in a way that retains critical flexibility as the coating dries down and cures, reducing the residual stress within the coating film. By contrast, Applicant believes that methyltrimethoxysilane-based coatings "set up" too quickly due to higher inherent reactivity, probably while there is still residual solvent in the coating. Thus, although from a theoretical viewpoint the final cured coating made from methyltrimethoxysilane ("MTMS") or methyltriethoxysilane ("MTES") would be expected to be the same, we find our cured coatings are in fact demonstrably different from prior art based on methyltrimethoxysilane, regarding Taber abrasion and steel wool test resistance and the lack of crazing, cracking and/or adhesion loss when extra-thick coatings are applied and cured.

A further advantage of coatings of the present invention over coatings of the prior art is the potentially higher flash point and lower vapor toxicity resulting from the effective replacement of methanol. The MSDS sheet for GE's SHC-1200 shows 17% methanol, which has 200 ppm TLV, and 19 C. (67 F.) flash point. In contrast, Applicants' Example 1 has 0% methanol, with ethanol instead having 1000 ppm TLV, and 25 C. (78 F.) flash point. A flash point of 23 C. (73 F.) or higher is required for expedited shipment by air freight.

In coatings of the present invention with "excess water", improved adhesion (or rate of development of adhesion at a given cure temperature) can be obtained by dipping twice to achieve the desired coating thickness (instead of dipping once at a faster withdrawal rate), by "pre-curing" to a "B stage" tack-free state (e.g., at 60 C. for 10 minutes—sometimes used for pre-inspection for coating flaws before final cure), and/or by ramping up to final cure temperature or stepping up, e.g., 93 C. for 10 minutes, 110 C. for 10 minutes, 121 C. for 5 minutes, then cure at 130 C.; instead of placing lenses in a preheated 130 C. oven directly. We believe that each of these 3 optional steps helps to selectively volatilize the water in (and released during initial cure of) the coating, while the tail solvent remains (sufficiently) to reduce initial dry-down or curing stresses and to promote bonding to the substrate.

The largest anticipated use of coatings and methods of the present invention is to provide previously unattained, economical (and environmentally friendly) abrasion resistance for a wide variety of articles of commerce, including large surface areas such as storage tanks, walls (including exterior surfaces, especially on land vehicles, boats and planes), and machinery. Although prior art hardcoatings might possibly be used for some of these applications, they are so user-unfriendly, expensive, capital-equipment intensive, and prone to problems that they have not seen any such broad usage. In contrast, coatings of the present invention are within the reach of thousands of small shops which could not afford the investment in equipment, expertise and up-front licensing fees and/or ongoing costs of use of the prior art coatings. Now such shops can, with a gallon or so of coating, a small recirculating pump and filter, and a clean-air booth, flow coat articles of almost any size or shape. On some substrates, a silane primer, usually applied by the same techniques, may be necessary. A home-made oven will usually suffice for curing. No worries about refrigeration of the coating or dehumidification of the coating application/drydown are are needed. The user-friendliness and relative storage/handling stability built into these coatings makes the difference in practicality.

In many cases, previously uncoated articles will be coated. In other cases, a currently-used coating will be replaced or topcoated, to provide a more abrasion resistant finish. In yet other cases, hardcoatings and methods of the present invention will be used for topcoating over a less-expensive and/or more environmentally friendly base coat than the coating previously used on the article to be coated, and the net result will be an enhanced-performance article with lower overall cost of manufacture. The substrate (article) may optionally be base coated and/or primed for smoothness, depth, adhesion, or other functional or cosmetic enhancement. The hardcoating (i.e., topcoat, optionally over a reduced-cost/environmentally friendly basecoat) provides improved abrasion resistance and/or reduced cost or environmental impact versus the unimproved article.

Although coatings of the present invention contain a substantial percentage of volatile organic compounds (VOC's), in terms of the square footage of surface covered their environmental impact is quite low, since they are applied much thinner than typical paint/varnish type coatings. Also, the enhanced durability vs. ordinary paints will lead to much less re-painting, with further economic and environmental savings.

Preparation of some specific formulations of the present invention are now given in the examples below:

EXAMPLE 1

A two-liter reaction vessel was charged with 533 g Nalco 1042 acid pH (34% solids in water) aqueous silica sol, 745 g methyltriethoxysilane and 51 g glacial acetic acid, heated to 60 C., and agitated until it exothermed to reflux at 84 C. It was cooled to 60 C., maintained one hour, then allowed to cool to room temperature. Four hours later, a latent condensation catalyst (0.65% s/s) was added, and the hazy solution was heated overnight (nominally 16 hours) at about 77 C., then allowed to cool down to ambient. After standing at room temperature for 7 days, 239 g of diacetone alcohol was added as tail solvent.

The resultant coating was used to dip coat acrylic and polycarbonate sheets at 26 C. and 39% R.H., followed by oven curing at 93 and 121 C., respectively. At 4–5 microns coating thickness, the cured coatings had 100% cross-hatched tape adhesion and showed few or no scratches when rubbed with #000 steel wool, using 5 double strokes under firm thumb pressure.

Equivalent results were obtained from analogous samples dip coated at up to 55% R.H., and yet no hazing "blush" of the coating was observed, and primerless polycarbonate adhesion and scratch resistance were excellent. Analogous samples coated after a month of solution aging at room temperature still gave 100% adhesion to polycarbonate and excellent scratch resistance.

EXAMPLE 2

A mixture of 19.5 g Nalco 1042, 17.5 g diacetone alcohol, 3.9 g glacial acetic acid, and 27.2 g methyltriethoxysilane was stirred vigorously and exothermed to 32–33° C. After 1½ hours, 22.1 g Nalco 1057 and an additional 27.2 g methyltriethoxysilane were added, and the mixture exothermed to 25–26° C. After another 2½ hours, a latent buffered catalyst (0.65% s/s) was added, giving a slightly hazy solution, which was then heated 8 hours at 79 C.

This formulation not only gave good adhesion on unprimed polycarbonate, as freshly prepared, but also after 5 months aging at room temperature, at which time it was still useable. Scratch resistance at 4–5 microns coating thickness was excellent, as in Example 1. Addition of fluorinated surfactant (3M's FC 430 in previously mentioned small concentrations) improved the coating flow-out/leveling for dip coating. An analogous formulation without the diacetone alcohol also gave 100% adhesion to unprimed polycarbonate—the 2-propoxyethanol solvent present in the Nalco 1057 was acting as substitute tail solvent, in that case.

EXAMPLE 3

Coatings propared analogously to those of Examples 1 & 2 were applied to injection-molded polycarbonate lenses.

Adhesion and scratch resistance were excellent. Scratch resistance was noticeably dependent on coating thickness, with the best resistance to 000 steel wool obtained at >4 microns coating thickness. The formulation like Example 2 developed 100% adhesion to PC faster than the coating like Example 1, even at a lower catalyst level. It was also more tolerant of high humidity while dip coating.

EXAMPLE 4

The coating solution of Example 2 was left at room temperature for 5 months, incompletely sealed, so that about 20% of the original volume evaporated. Used as-is for dip coating a polycarbonate plano safety spectacle lens, at 5-inch-per-minute withdrawal rate, the cured coating was about 12 microns thick, but was smooth and still had 100% adhesion and outstanding scratch resistance, without cracking or crazing. Five double rubs under firm pressure with very coarse #3 steel wool only produced a few, mostly fine scratches. After dilution with isopropanol, similar results were obtained by flow coating.

EXAMPLE 5

Coatings analogous to Examples 1 & 2, but prepared with diacetone alcohol added prior to the methyltriethoxysilane and/or optionally without heat-accelerated aging or "bodying", and especially with a surfactant such as FC-430, were used on polycarbonate safety lenses, and gave excellent cured coatings equivalent to those of Examples 1 & 2.

EXAMPLE 6

A coating prepared from 13.2 parts Nalco 1042, 24.6 parts methyltriethoxysilane, 1.7 parts glacial acetic acid, 7.9 parts diacetone alcohol, 1% (s/s) quaternary anmonium catalyst, and 0.006 parts FC-430 was used to coat a polycarbonate lens, giving a cured coating with 100% adhesion and with scratch resistance barely less than the coating of Example 1, despite the use of 25% less silica on a relative basis. The coating developed 100% adhesion in a faster time with more catalyst, but some crazing appeared in the cured coating at 1.5–2.0 % catalyst.

EXAMPLE 7

A coating like Example 2, but without diacetone alcohol, and only using ¼ as much glacial acetic acid, gave excellent results like Example 2. It was free of haze from drydown at up to 75% RH. On polycarbonate, the cured coating had outstanding Taber abrasion resistance using CS-10 wheels, such that the change in haze after 500 revolutions was 2–3%. This is much better than typical results for Clark or Frye/Vaughn coatings, in the range of 5–7% change in haze after 500 revolutions.

EXAMPLE 8

To show the advantage of using methyltriethoxysilane ("MTES") instead of methyltrimethoxysilane ("MTMS") in the coatings of the present invention, a series of mixtures of Nalco 1042, silane(s) and acetic acid was prepared. To each of the seven vials were added in order the ingredients listed in Table 1, followed by capping, shaking 15 seconds twice (with a 15-second delay), letting stand ½ hour, and tumbling 1 hour. Sample 1, with only methyltrimethoxysilane present, became homogeneous and quite warm immediately upon shaking. The other samples through Sample 7 were progressively slower to become homogeneous and became less warm, but all were homogeneous after tumbling. The vials were then let stand at ambient temperature until they gelled, to demonstrate the relative stability of scratch resistant coating resins made from colloidal silica and either or both methyltriethoxysilane and/or methyltrimethoxysilane. As shown in Table 1, there is a 5–50 fold increase in the stability of the mixture when half or more of the methyltrimethoxysilane is replaced with methyltriethoxysilane. Although dilution is known to increase the stability of these mixtures, the effect with methanol by itself is small (2.5× for a dilution equivalent to the greater volume of Sample 7 versus Sample 1), as confirmed in a separate analogous test.

TABLE 1

| Sample No.; | 1 | 2 | 3 | 4 | 5 | 6 | 7 |
|---|---|---|---|---|---|---|---|
| MTMS:MTES mole ratio | 6:0 | 5:1 | 4:2 | 3:3 | 2:4 | 1:5 | 0:6 |
| MTMS, grams | 1.08 | 0.90 | 0.72 | 0.54 | 0.36 | 0.18 | — |
| MTES, grams | — | 0.24 | 0.47 | 0.71 | 0.94 | 1.18 | 1.41 |
| Acetic Acid, drops* | 2 | 2 | 2 | 2 | 2 | 2 | 2 |
| Nalco 1042, grams | 1.01 | 1.01 | 1.01 | 1.01 | 1.01 | 1.01 | 1.01 |
| Days to gel | 3 | 5–7 | 11 | 18–23 | 44 | 134 | >230 |

*2 drops glacial acetic acid = 0.035–0.04 grams

Comparative Example A

A mixture of 43.7 g Nalco 1042 and 19.7 g diacetone alcohol (added at this point to reduce viscosity) was chilled in an ice bath, and a mixture of 46.6 g methyltrimethoxysilane and 2.3 g glacial acetic acid was added and stirred in vigorously at a rate to limit exotherm to −15 C. (5 F.). After standing 12 hours in the ice bath, a mixture of 2.1 g acetic acid, 6.1 g isopropyl alcohol, and a latent condensation catalyst (0.65% s/s) were added and mixed in.

After standing about a week at room temperature to develop "body" (increased molecular weight & viscosity), the coating was used to dip coat acrylic and polycarbonate sheets, followed by oven curing at 93 and 121 C. respectively, at the same time as the samples coated with the formulation of Example 1. At 4–5 microns coating thickness, the cured coatings had 100% cross-hatched tape adhesion only on acrylic. Adhesion to polycarbonate was 0–20%, even after curing overnight at 121 C. On either substrate, finest steel wool resistance was comparable, but not equal to that for Example 1. Coarser steel wools stripped the poorly-adhered coatings.

Comparative Example B

A commercial coating offered by SDC Coatings Inc., of Anaheim, Calif., named "Silvue 121", believed to comprise a reaction product of acidic aqueous colloidal silica and methyltrialkoxysilane but containing no "tail solvent" as defined herein, gave 0% adhesion when coated and cured on unprimed polycarbonate under conditions analogous to those for Example 1. (Apparently recognizing that limitation, SDC sells various primers to be used on polycarbonate substrates with such coatings.)

Comparative Example C

SHC-1200 from GE Silicones, Waterford, N.Y., was used to prepare a 4–5 micron coating on unprimed polycarbonate, by dipcoating and curing as for Example 1. Steel wool testing showed that the coating according to Example 1 had equal or slightly better abrasion resistance than this GE coating, which contains diacetone alcohol. This GE competitive coating had 100% adhesion on unprimed polycarbonate, but can be very unstable in an open-topped diptank operating at room temperature, even with continuous pump circulation and filtration.

EXAMPLE 9

Coatings like Example 2, but using all aqueous silica (replacing the Nalco 1057), or like Example 7 (optionally containing a second tail solvent such as benzyl ether, hydroxyacetophenone, or dichlorotoluene) were coated and cured on a variety of substrates, giving excellent adhesion and abrasion resistance on wood (bare or primed with sanding sealer or acrylic coating as an alternative to a more-expensive polyurethane, or on so-called faux finishes on wood in a positive-results direct comparison test to a polyurethane); melamine-cured and epoxy coatings or primers; silane-primed brass, copper, mild & stainless steel (including anti-corrosion primed steel), aluminum (including anti-corrosion treated aluminum); glass (with or without added epoxy silane); caustic-etched CR-39 plastic; primed, painted plastic, a section of a clear-coated auto body panel; several types of polished stone tiles and tile grout; sanded polyurethane coating on carbon fiber shafts; eyeglass frames; cd's; acrylic watch crystals; and colored acrylic panels. The coatings were applied by flowing, brushing, dipping or spinning at ambient temperature and humidity (typically 40–65% RH) without "blushing." The cured coatings with 100% adhesion survived 10–40 vigorous rubs with #2 steel wool under at least 10 pounds applied (downward) force with 0–6 visible scratches (except on bare wood and polycarbonate, due to the substrate softness). On polycarbonate, the coatings survived 10 such rubs with #1 or #2 steel wool. By comparison, a recently introduced ophthalmic coating on polycarbonate said to have tiger-like properties was scratched by #0000 steel wool. A diamond-like film on a polycarbonate lens, produced by the now-defunct Diamonex company, suffered slight scratching with #2 steel wool.

I claim:

1. A method for imparting improved abrasion resistance to a solid substrate, comprising the steps of:
   a. preparing or obtaining a liquid thermosettable hardcoating composition comprising a condensation-reaction copolymerization product of an acidic aqueous colloidal silica sol, or at least functionally equivalent solvent-based sol, or metal oxide particle suspension or metal ester or mixture therewith, with one or more monomethyltrialkoxysilanes consisting of less than 50 mole percent monomethyltrimethoxysilane and said reaction product being with an additive means of promoting cure, and at least one tail solvent, and where said hardcoating composition can be stored at room temperature for greater than 30 days without bulk gelation;
   b. coating said substrate with said liquid thermosettable hardcoating composition sufficient to apply 0.1–50 microns dry-film coating thickness;
   c. drying to remove solvent and, if present, water; and
   d. curing the coating.

2. A method of claim 1 wherein said liquid thermosettable hardcoating composition has been maintained substantially at room temperature for greater than 30 days without bulk gelation or loss of basic properties upon curing on said substrate.

3. A method of claim 1 wherein said liquid thermosettable hardcoating composition is applied while being maintained substantially at room temperature.

4. A method of claim 1 wherein said liquid thermosettable hardcoating composition is applied while being maintained substantially at room temperature, and the steps of coating and drying to remove solvent and water are conducted without blush in the presence of ambient relative humidity greater than 40% during drydown.

5. A method of claim 1 wherein said liquid thermosettable hardcoating composition contains excess water beyond the stoichiometric amount needed for hydrolysis of silane and/or other metal esters, and with the additional step of said substrate being coated at least a second time, after at least partially drying to remove solvent and water after being coated a first time, without substantially heat curing the coating to its hardened state until said second layer is applied and at least partially dried to remove solvent and water.

6. A method of claim 1 wherein said liquid thermosettable hardcoating composition is applied directly onto unetched and unprimed polycarbonate substrate, thus eliminating any step of etching or applying and drying any liquid primer before coating, such that a cured film of at least 4 microns thickness of said liquid thermosettable hardcoating composition has PSW scratch resistance surviving #000 steel wool, and 100% cross-hatched adhesion.

7. A method of claim 1 wherein said liquid hardcoating composition comprises a reaction product of an acidified aqueous dispersion of colloidal silica sol having average particle size <100 millimicrons in diameter, or at least functionally equivalent sol or ester, with one or more monomethyltrialkoxysilanes consisting of less than 50 mole percent monomethyltrimethoxysilane, wherein said reactants are copolymerized in a ratio of not less than 30:70 and not more than 70:30, and said reaction product being with a condensation catalyst and at least one tail solvent; wherein said liquid thermosettable hardcoating composition, after standing at room temperature for 30 days, does not bulk gel nor lose basic properties on curing on said substrate; wherein said coating is maintained substantially at room temperature; and wherein said drying to remove solvent and any water is carried out without blush in the presence of ambient relative humidity greater than 40% during drydown.

* * * * *